P. Morrison,

Salt Spile.

No. 87,960. Patented Mar. 16, 1869.

Witnesses:

Inventor:
P. Morrison

United States Patent Office.

PAIGE MORRISON, OF STARKSBOROUGH, VERMONT.

Letters Patent No. 87,960, dated March 16, 1869.

IMPROVEMENT IN SAP-SPILES.

The Schedule referred to in these Letters Patent and making part of the same.

*To all whom it may concern:*

Be it known that I, PAIGE MORRISON, of Starksborough, in the county of Addison, and State of Vermont, have invented a new and useful Improvement in Sap-Spiles; and I do hereby declare that the following is a full, clear, and exact description of the same, reference being had to the annexed drawings, making part of this specification, in which—

Corresponding letters refer to corresponding parts in the several figures.

This invention relates to sap-spiles; and

Figure 3:
Figure 3 is a similar section on line $y\ y$ of fig. 2.
Figure 2:
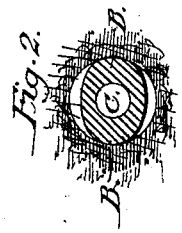
Figure 2 is a cross-section of the spile on line $x\ x$ of fig. 1.
Figure 1:
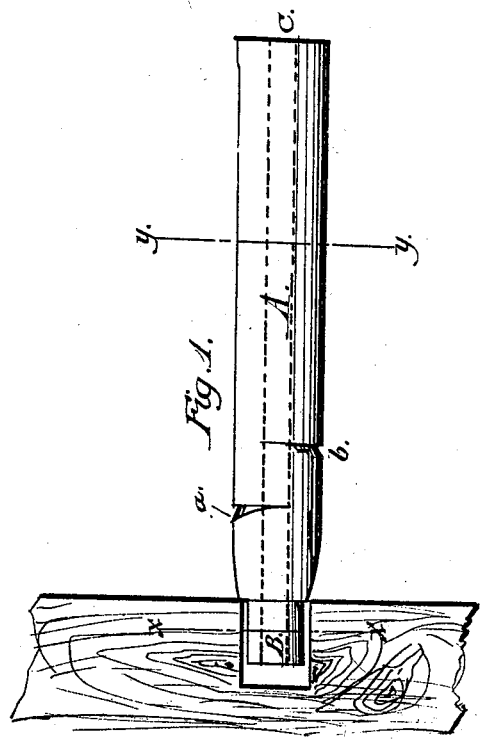
Figure 1 represents, in elevation, my improved spile as applied to a tree.

It consists in constructing a spile, with that portion thereof which enters the tree, of an oval or oblong form in its cross-section, in order that those portions of the aperture through which the sap flows most freely, may not be obstructed by such spile, as will be more fully described hereafter.

A, in the drawings, represents a spile for use in securing the sap of trees, which is cylindrical in form for the greater portion of its length.

This spile has an aperture, C, which passes entirely through the same.

It is also provided upon its circumference with notches $a$ and $b$, upon or from which the vessel for receiving the sap may be suspended.

B is that section, or portion of the spile which enters the hole formed in the trees.

This section is oval, or oblong in cross-section, the object of which is to prevent the same from coming in contact with the interior of the holes formed in the tree, thus leaving the sap free to flow out of the pores of the same, and inward, to and around the end of the spile, and there find free egress through the aperture, or passage C.

That portion of the body of the spile which is next to the oval portion, is tapering in form, so that as the spile is driven into the tree, it shall fill the hole made in the bark, or outer coating thereof, and thus prevent the flow of the sap outward, around said spile, and compel it to flow inward, along the passages caused by the form of the inner end thereof, and out through the same, as above described.

The advantage of this form of construction will be readily perceived when it is remembered that the largest portion of the sap, which is gathered from an aperture, cut or otherwise formed in any sap-producing tree, passes out through that portion of such aperture where the fibres, or grains of the tree are cut at right angles with the body of the tree. This being the case, it follows that any sap-spile which presses hard upon such cut fibres, or grains, will, to a great extent, obstruct the flow of the sap, which, by the use of my spile, will be left free to flow out, and will be caught thereby and conveyed into the vessel arranged for its reception.

Having thus described my invention,

What I claim, and desire to secure by Letters Patent, is—

A sap-spile, constructed substantially as herein described and shown, namely, with that portion thereof which enters the apertures formed in the wood, of oval, or oblong form in its cross-section.

In testimony whereof, I have signed my name to this specification, in the presence of two subscribing witnesses.

PAIGE MORRISON.

Witnesses:
JOSEPH GRENNELL,
SARAH H. GRENNELL.